United States Patent
Plasek et al.

(10) Patent No.: US 7,363,284 B1
(45) Date of Patent: Apr. 22, 2008

(54) SYSTEM AND METHOD FOR BUILDING A BALANCED B-TREE

(75) Inventors: James M. Plasek, Shoreview, MN (US); Kelsey L. Bruso, Minneapolis, MN (US)

(73) Assignee: Unisys Corporation, Blue Bell, PA (US)

( * ) Notice: Subject to any disclaimer, the term of this patent is extended or adjusted under 35 U.S.C. 154(b) by 556 days.

(21) Appl. No.: 10/836,529

(22) Filed: Apr. 30, 2004

(51) Int. Cl.
*G06F 17/30* (2006.01)

(52) U.S. Cl. .......................... 707/1; 707/101; 707/102

(58) Field of Classification Search ................. 707/100
See application file for complete search history.

(56) References Cited

U.S. PATENT DOCUMENTS

| | | | |
|---|---|---|---|
| 4,945,475 A * | 7/1990 | Bruffey et al. ................. | 707/1 |
| 5,557,786 A | 9/1996 | Johnson, Jr. | |
| 5,644,763 A | 7/1997 | Roy | |
| 5,649,023 A * | 7/1997 | Barbara et al. ............. | 382/159 |
| 6,073,129 A * | 6/2000 | Levine et al. .................. | 707/4 |
| 6,105,033 A * | 8/2000 | Levine ........................ | 707/101 |
| 6,347,318 B1 | 2/2002 | Rokicki | |
| 6,353,819 B1 * | 3/2002 | Edwards et al. ............... | 707/2 |
| 6,353,820 B1 * | 3/2002 | Edwards et al. ............... | 707/2 |
| 6,438,536 B1 * | 8/2002 | Edwards et al. ............... | 707/2 |
| 6,591,269 B1 | 7/2003 | Ponnekanti | |
| 6,622,141 B2 * | 9/2003 | Lee et al. ....................... | 707/5 |
| 6,668,263 B1 | 12/2003 | Cranston et al. | |
| 6,675,157 B1 | 1/2004 | Mitchell | |
| 6,675,173 B1 | 1/2004 | Shadmon | |
| 6,694,323 B2 * | 2/2004 | Bumbulis ................... | 707/101 |
| 7,146,295 B2 * | 12/2006 | Goodman et al. ............. | 703/1 |
| 2002/0095412 A1 * | 7/2002 | Lee et al. ....................... | 707/7 |
| 2003/0204513 A1 * | 10/2003 | Bumbulis ................... | 707/100 |
| 2004/0243553 A1 * | 12/2004 | Bailey ........................... | 707/3 |

\* cited by examiner

*Primary Examiner*—Wilson Lee
*Assistant Examiner*—Sheree N Brown
(74) *Attorney, Agent, or Firm*—Charles A. Johnson; Robert Marley; Shumaker & Sieffert, PA

(57) ABSTRACT

A system and method for building a hierarchical table is described. According to one embodiment, sorted data is stored within, or otherwise associated with, a newly created leaf node. The leaf node is then added to the table in a manner that ensures that after the addition is completed, all leaf nodes within the table will reside at a same level within the table hierarchy. Thus, the table is constructed in a balanced manner, and no re-balancing of the table is required after table construction has been completed. According to another aspect, a balanced table may be constructed incrementally such that users are allowed to access data stored within the table while additional, related data is added to a second table that is later merged with the table. This incremental approach may adapted to construct unbalanced, as well as balanced, tables.

24 Claims, 12 Drawing Sheets

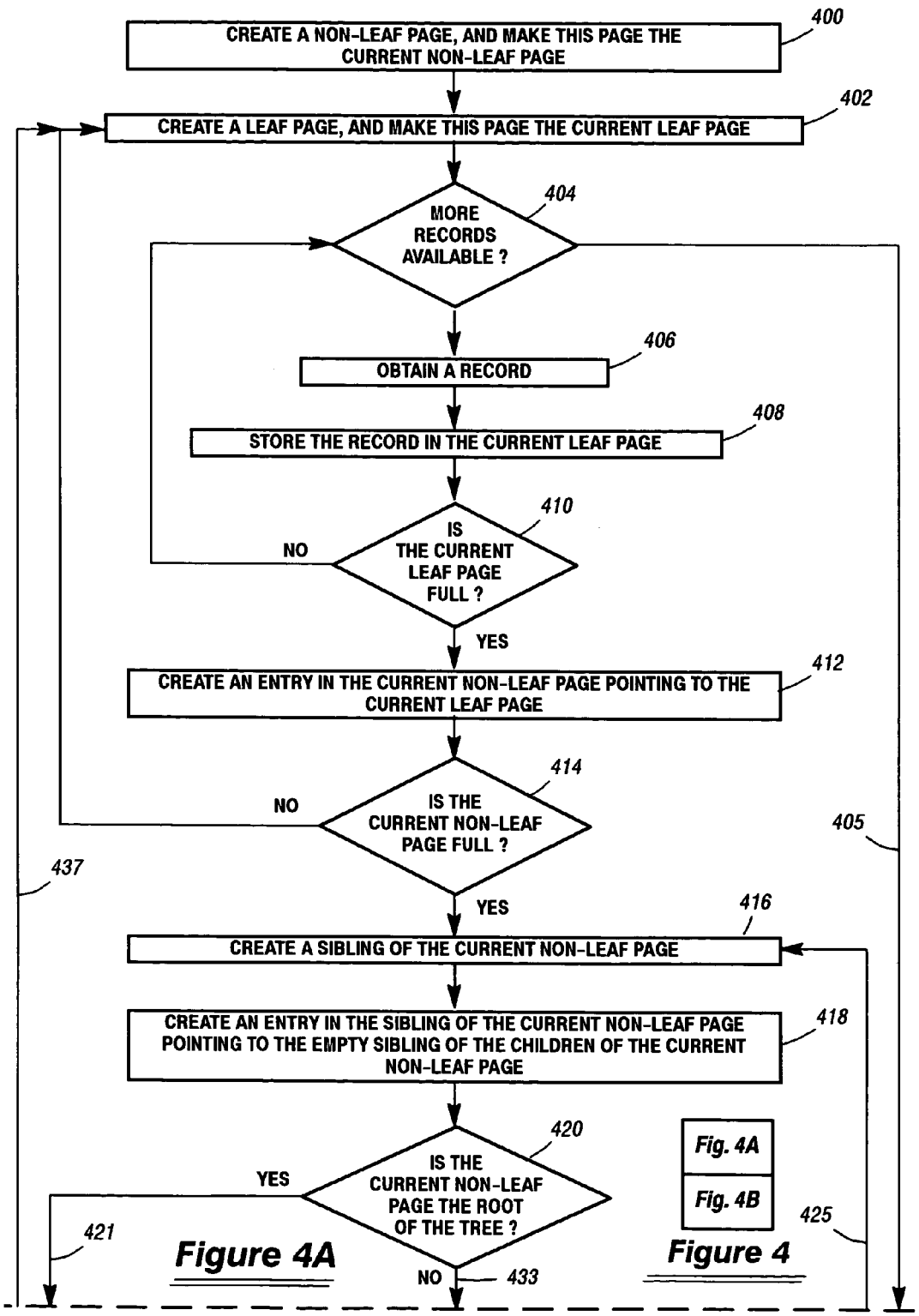

SYSTEM AND METHOD FOR BUILDING A BALANCED B-TREE

FIELD OF THE INVENTION

This invention relates to a system and method for constructing a data structure; and, more specifically, relates to a mechanism for constructing a tree structure in a more efficient manner.

BACKGROUND OF THE INVENTION

Computers are used today to store large amounts of data. Such information is often stored in information storage and retrieval systems referred to as databases. This information is stored and retrieved from a database using an interface known as a database management system (DBMS).

One type of DBMS is called a Relational Database Management System (RDBMS). An RDBMS employs relational techniques to store and retrieve data. Relational databases are organized into tables, wherein tables include both rows and columns, as is known in the art. A row of the horizontal table may be referred to as a record.

One type of data structure used to implement the tables of a database is a B-tree. A B-tree can be viewed as a hierarchical index. The root node is at the highest level of the tree, and may store one or more pointers, each pointing to a child of the root node. Each of these children may, in turn, store one or more pointers to children, and so on. At the lowest level of the tree are the leaf nodes, which typically store records containing data.

In addition to the pointers, the nodes of the B-tree also store at least one key value used to search the tree for a particular data record. For instance, assume a node stores a first key value, and first and second pointers that each point to a child node. According to one exemplary organizational structure, the first pointer may be used to locate the child node storing one or more key values that are less than the first key value, whereas the second pointer is used to locate the child storing one or more key values greater than, or equal to, the first key. Using the key values and the pointers to search the tree in this manner, a node may be located that stores a record associated with a particular key value that is used as the search key.

DBMS applications typically build B-trees according to the following process. The DBMS application obtains a first record having a first key value that is to be added to new B-tree. A root node is created that points to a leaf node, and the record is stored within the leaf node. When a second record is received, the key value stored within the root node and the second record will be used to determine whether the second record will be stored within the existing leaf node or within a newly created leaf node. The point of insertion will be selected so that all records are stored in a sort order based on the key values. Similarly, as additional records are received, the records are added to the tree by traversing the tree structure using the key values to locate the appropriate location of insertion, then adding leaf nodes as necessary. Whenever it is determined that the root or an intermediate node has too many children, that node is divided into two nodes, each having some of the children of the original node. Similarly, it is determined that a record must be added to a leaf node that is too full to receive the record, the leaf node must be split to accommodate the new addition.

The foregoing approach of building trees in a top down manner is generally employed when a tree is created from a stream of unsorted records. In this situation, the relationship existing between the key values of two sequentially received records is unknown. As a result, the tree must always be searched to find the appropriate location for insertion of the record.

Another consequence of the foregoing mechanism involves the allocation of storage space. Generally, each node of the tree is stored in an addressable portion of storage space that can be retrieved using a single I/O operation. This portion of storage space may be referred to as a "page". When adding records to a node, it may be desirable to store this information in a way that will allow additional information to be readily inserted into the page that stores the node. For example, it may be desirable to reserve space between two records having non-sequential key values so that a record having an intermediate key value can be inserted onto the page without having to move any of the existing records. This objective complicates the building of B-trees from a stream of unsorted records.

In some situations, a DBMS application builds a tree structure from a stream of sorted records. That is, a know relationship exists between the key and/or index values of sequentially received records. For example, it may be known that the key value of a first record will be less than that of the record that is encountered next, which, in turn, will be less than that of the record received thereafter. In this type of situation, it may be advantageous to build the B-tree from the bottom up. According to this scenario, a page is allocated to a leaf node. Records are stored in the leaf node according to the order of receipt. Since the records are sorted, no space needs to be reserved for later insertion of additional records. When the page is full, a non-leaf, or "index", node is created to point to this leaf node. A second pointer is stored within this "index" node to point to a second newly-created leaf node which will receive the next sequence of records. When the first index node is full, a second index node is added that points to the first index node. This second index node will also point to another leaf node, and the process will be repeated.

Several disadvantages exist with the foregoing approach to building a B-tree. First, as records are added to the tree, the tree becomes unbalanced. In other words, the number of levels of hierarchy existing between the root node and a given leaf node may vary widely. For instance, in the foregoing example, two levels of hierarchy exist between the second index node and the records that were received first. Only one level of hierarchy exists between the second index node and latter received records. This disparity will continue to grow as hierarchical levels are added to the tree. As a result, search times will not be uniform, but will depend on which leaf node stores a particular record.

One way to address the foregoing problem is to re-balance the tree after it is constructed. This involves "shuffling" nodes so that all paths to the leaf nodes approximately traverse the same number of hierarchical levels. To do this, some existing links between hierarchical levels are severed and new links are created. Additionally, some pages may be divided in half to allow room to add the additional links. This re-balancing activity is time-consuming.

Another problem with the foregoing mechanism involves the latency associated with data availability. In general, data is not available to a user as a table is being constructed. If a large number of records are received for entry into a table, none of the data will be available until the entire table is constructed. This time could be prohibitively large. Thus, a system and method is needed to address the foregoing limitations.

SUMMARY OF THE INVENTION

The current invention provides an improved system and method for building a hierarchical table. In particular, a system and method for constructing a tree representation of a relational database table is disclosed. According to the invention, sorted data is stored within, or otherwise associated with, a newly created leaf node of the tree. The leaf node is then added to the tree in a manner that ensures that after the addition is completed, all leaf nodes will reside the same distance from the root of the tree. Thus, the tree is constructed in a balanced manner, and no re-balancing of the tree is required after tree construction has been completed.

According to one embodiment of the invention, a newly created leaf node may be linked to a candidate non-leaf node that resides one hierarchical level above the leaf nodes in the database hierarchy. Because the database table is being constructed using sorted data, the non-leaf candidate will be that node most recently added to this level of the hierarchy. If the candidate nodes does not have storage space available to allow this linking to occur, a sibling will be created for the candidate. This sibling becomes the candidate node that is available to link to another leaf node in a manner that allows the tree to remain balanced.

If a sibling is created to serve as the candidate node to link to the next leaf node, this sibling is added to the database table as follows. A node must be located to link to the candidate. The node will be located one hierarchical level above the candidate node. Again, because the tree is being constructed using sorted data, it is known that the node to locate will be the one most recently added to the hierarchical level, which is directly above the candidate. If the located node has adequate storage space available, it will be made the parent of the candidate node. Otherwise, a sibling will be created for the located node, and this second sibling will be made the parent of the candidate. Next, the newly-created sibling will be considered the candidate node, and the process of adding this candidate to the database tree will be repeated. If the root node of the database table is encountered during this process, and the root node is determined to be full such that it may not be made the parent of an additional node, both a parent and a sibling are created for the root node. The sibling and root node becoming children of the parent, and the parent becomes the new root. In this manner, both leaf and non-leaf nodes are added to the tree so that the tree always remains balanced.

According to one embodiment of the invention, the sorted data that is added to the database table is contained in data records. The records are sorted according to one or more fields of the record. Any one or more fields may be used to determine the sort order.

The invention applies to the construction of tree structures that include, but are not limited to, B-trees and B+-trees. As is known in the art, B+ trees store data records or pointers to data records only in leaf nodes of the tree. The non-leaf nodes function as an indexing structure to find a desired leaf node. In contrast, B-trees store data records in both the leaf and non-leaf nodes. The invention provides for more efficient searching of data records in either of these tree structures.

In one embodiment, data records are stored within the leaf nodes within records of a predetermined size. A predetermined number of records may be stored within each leaf node. In another embodiment, only some of the data within the records is stored within the leaf nodes. Other data values are stored within other areas of storage. Pointers and/or other indicia link the record in the leaf node with its associated values in these other areas of storage. This may be desirable for record fields that store a large amount of data, such as binary large objects (BLOBs) fields.

According to one embodiment, the sorted data is record data that is stored according to one or more fields of the record. Any one or more fields may be used to determine the sort order.

According to another aspect of the invention, the database table may be built incrementally. That is, a B+-tree representation of a database table may be constructed from sorted data in the foregoing manner to create a balanced tree. Users may then be allowed to access the resulting database table. In the mean time, additional sorted data may be used to construct another B+-tree representation of a database table. The additional sorted data may be viewed as part of a continuous stream of the data used to build the original tree. Therefore, the additional database table may be viewed as a continuum of the original database table.

After the additional database table is constructed, it may be added to the database table. Since a continuous data stream was used to construct both tables, this addition may be accomplished by linking an edge of the database table to an edge of the additional table. This linking process is performed so that the resulting database table is balanced, with all leaf nodes residing at a same level in the hierarchy. Access to the database table may then resume. This process of building an additional table, then merging the table into the original table, may be repeated any number of times. Because construction of the additional tables occurs while access to the database table is occurring, much of the time associated with building the database table is transparent to the user.

Although the invention may be usefully employed in database applications, it may further find application in any environment wherein hierarchical data structures are constructed and maintained. Such environments may include spreadsheets, indexed spell checkers, or other situations wherein data is maintained according to a sort order.

According to one embodiment of the invention, a method of constructing a hierarchical data structure is disclosed. The method includes creating, and storing data to, one or more leaf nodes, and making a non-leaf node of the data structure a parent of each of the one or more leaf nodes. The method further involves creating another non-leaf node, and adding it to the data structure so that the newly created non-leaf node, and all other non-leaf nodes within the data structure that are parents of leaf nodes, are located a same number of hierarchical levels from the root of the data structure. These steps may be repeated one or more times to build the data structure.

In another embodiment, a system is provided for building a balanced hierarchical tree that has leaf nodes, non-leaf nodes, and a root. The system includes a storage device, and a processor coupled to the storage device. The processor creates one or more leaf nodes within the storage device to store data as the data is received by the processor. The processor is capable of linking each leaf node, as it is created, to a non-leaf node that is positioned at a hierarchical level of the tree such that, after each leaf node is added to the tree, all leaf nodes of the tree reside a same number of hierarchical levels from the root.

According to another aspect of this invention, the method includes allowing a user to search the data structure. Searching may be performed while a second hierarchical data structure is created that has all leaf nodes residing a same number of hierarchical levels from its root. The method further includes preventing access to some nodes of the data structure, and making the second data structure and the data structure a single updated data structure includes all leaf nodes from the database structure and the second database structure. All of those leaf nodes reside a same number of hierarchical levels from the root of the updated database structure. This process may be repeated one or more times.

In another embodiment, the method comprises a computer-implemented method of building a hierarchical tree including creating a leaf node, storing data within the leaf node, and selecting a predetermined non-leaf node that may potentially be made the parent of the leaf node, wherein the predetermined non-leaf node is selected such that data within the leaf node and all other leaf nodes of the tree will be maintained in a predetermined sort order. According to this method, if the predetermined non-leaf node includes sufficient storage space, the predetermined non-leaf node is made the parent of the leaf node. If the predetermined non-leaf node does not include sufficient storage space, one or more additional non-leaf nodes are created to add to the tree, one of the one or more additional non-leaf nodes being made the parent of the leaf node such that the leaf node is located at the same level in the hierarchy of the tree as any other leaf node included within the tree.

In still another embodiment, a system is provided for constructing a balanced hierarchical tree having a root, leaf nodes and non-leaf nodes. The system includes means for storing data to one or more leaf nodes in a sort order, and means for adding each of the one or more leaf nodes to the tree so that the sort order is maintained, and so that after each leaf node is added to the tree, all leaf nodes in the tree are a same distance from the root.

Although the above described embodiments involve the creation of a balanced tree structure, the incremental method of building a data structure may be used to create balanced or unbalanced tree structures. For example, in one embodiment, the incremental method of constructing a table may be used to merge a balanced tree structure to an unbalanced tree, or to merge two unbalanced tree structures. This may be repeated any number of times in the manner similar to that discussed above in regards to the balanced tree structures.

According to the foregoing embodiment, a computer-implemented method of building a tree from a sorted stream of data is disclosed. This method includes storing a portion of the data in a tree structure, allowing users to gain access to data stored within the tree structure, and while the users are accessing the tree structure, storing another portion of the data within a sub-tree structure. The users are then temporarily prevented from accessing the data stored within the tree structure while the sub-tree structure is added to the tree structure to create an updated tree structure. Users may then gain access to data stored within the updated tree structure. This process may be repeated any number of times.

Other scopes and aspects of the invention will be apparent to those skilled in the art from the following description and the accompanying drawings.

BRIEF DESCRIPTION OF THE DRAWINGS

FIGS. 4A and 4B, when arranged as shown in FIG. 4, are a flow diagram illustrating the process exemplified by FIG. 3.

DETAILED DESCRIPTION OF THE DRAWINGS

The following description provides exemplary embodiments of the current invention, which is a system and method for building a hierarchical data structure. The exemplary embodiments focus on the invention system and method as it may be employed within a database management system. However, the invention may be adapted for use with knowledge base systems, decision support systems, and data warehouses. In general, any other type of system that uses a B-tree or B+ tree as its data structure may usefully employ the invention. This may include spell checkers, spreadsheets, or any other similar application maintaining sorted data.

Figure 1:
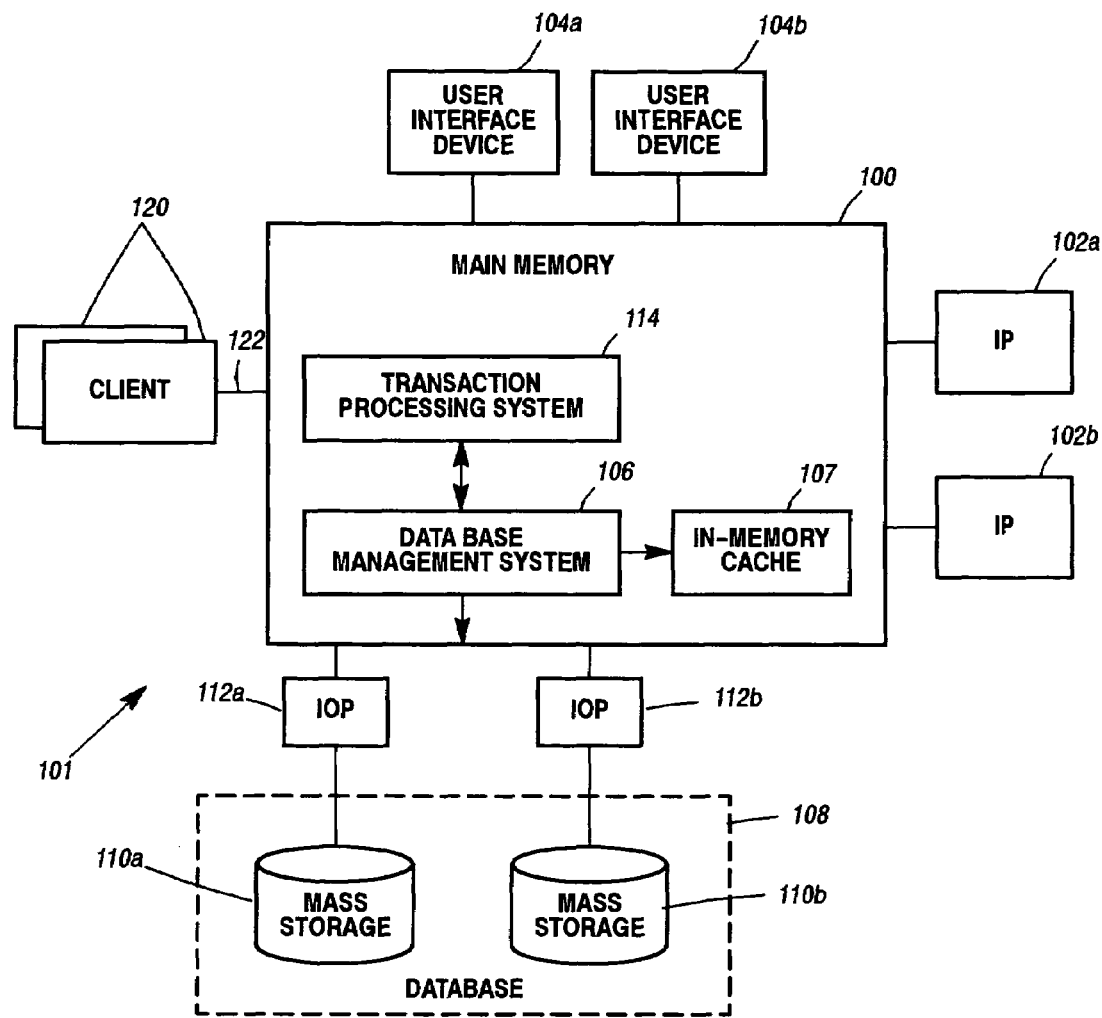
FIG. 1 is a block diagram of an exemplary data processing system that may usefully employ the current invention.

FIG. 1 is a block diagram of an exemplary data processing system 101 that may usefully employ the current invention. The data processing system may be a personal computer, a workstation, a legacy-type system, or any other type of data processing system known in the art. The system includes a main memory 100 that is interactively coupled to one or more Instruction Processors (IPs) 102a and 102b. The memory may also be directly or indirectly coupled to one or more user interface devices 104a and 104b, which may include dumb terminals, personal computers, workstations, sound or touch activated devices, cursor control devices such as mice, printers, or any other known device used to provide data to, or receive data from, the data processing system.

A DataBase Management System (DBMS) 106 is loaded into main memory 100. This DBMS, which may be any DBMS known in the art, manages, and provides access to, a database 108 (shown dashed). The database may be stored on one or more mass storage devices 110a and 110b. Mass storage devices may be hard disks or any other suitable type of non-volatile or semi non-volatile device. These mass storage devices may be configured as a Redundant Array of Independent Disks (RAID). As known in the art, this configuration provides a mechanism for storing multiple copies of the same data redundantly on multiple hard disks to improve efficient retrieval of the data, and to increase fault tolerance. Battery back-up may be provided, if desired. The transfer of data between mass storage devices and DBMS is performed by Input/Output Processors (IOPs) 112a and 112b.

A transaction processing system 114 may be coupled to DBMS 106. This transaction processing system receives queries for data stored within database 108 from one or more users. Transaction processing system formats these queries, then passes them to DBMS 106 for processing. DBMS 106 processes the queries by retrieving data records from, and storing data records to, the database 108.

The system of FIG. 1 may further support a client/server environment. In this case, one or more clients 120 are coupled to data processing system 101 via a network 122, which may be the Internet, an intranet, a local area network (LAN), wide area network (WAN), or any other type of network known in the art. Some, or all, of the one or more clients 120 may be located remotely from data processing system.

It will be appreciated that the system of FIG. 1 is merely exemplary, and many other types of configurations may usefully employ the current invention to be described in reference to the remaining drawings.

Figure 2:
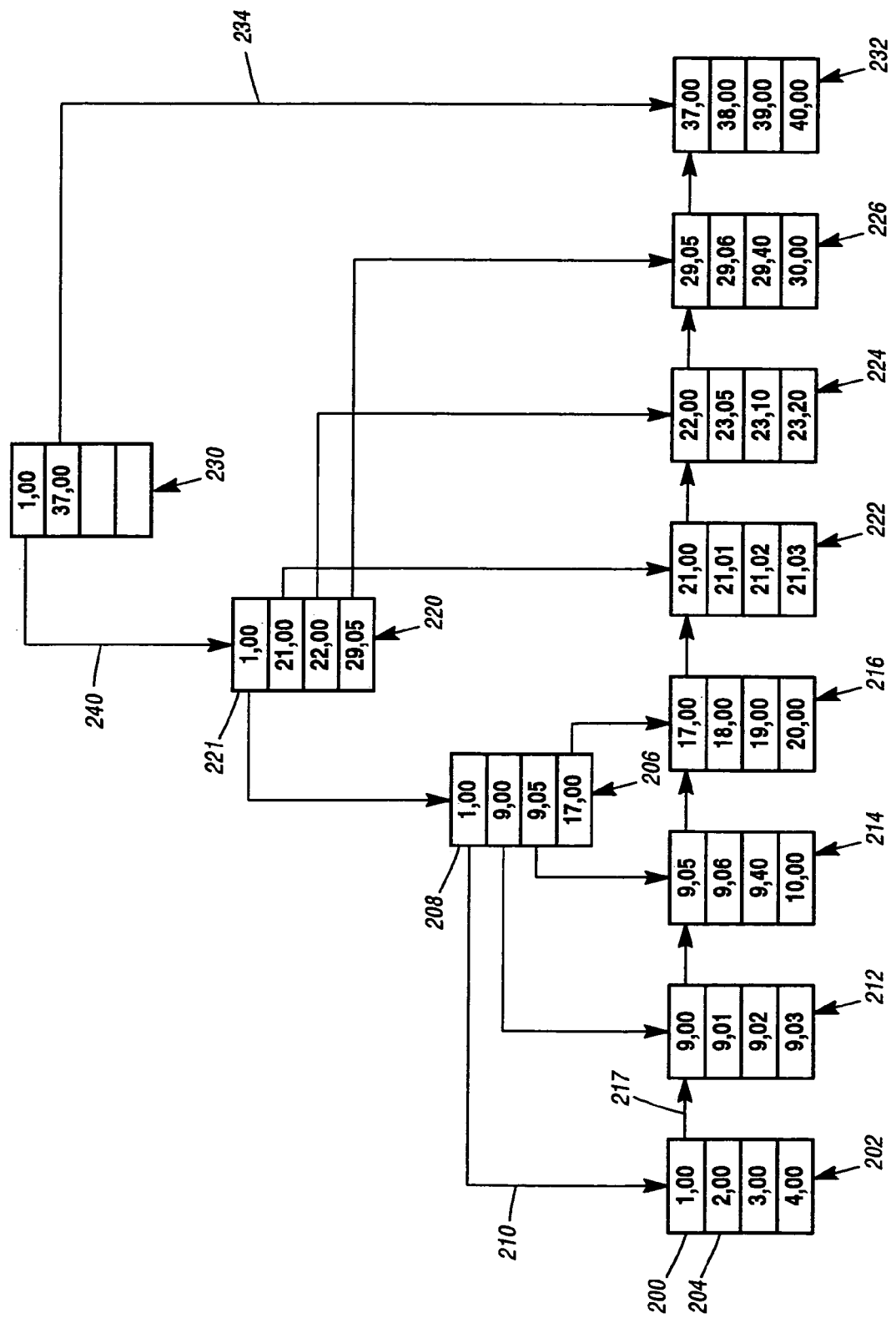
FIG. 2 is an example of a B+-tree constructed from sorted records using a prior art method.

FIG. 2 is an example of a B+-tree constructed from sorted records using a prior art method. According to the prior art method of FIG. 2, a stream of records is received such that a known relationship exists between the index values of sequentially received records. In the illustrated example, the stream of records is sorted so that the index values appear in ascending order.

The first received record 200 has an index value of "1,00". This record is stored in a leaf node that is allocated on page 202 of storage space. In this example, the page stores up to four records. In practice, each page may store an arbitrarily large number of records that is dictated by page size. The next received record 204 has an index value of "2,00", and is also stored on page 202. Since the records are in a sorted stream, there is no need to reserve space to insert any records between this and the previously received record, so the records may be stored contiguously on the page. Two more records are received before the page is filled.

After page 202 is filled, the first non-leaf node may be created and is allocated another page 206 of storage space. The first entry 208 on page 206 includes the index value "1,00" of the first record on page 202. In another embodiment, this entry might include the last index value "4,00" that appears on page 202. In still another embodiment, this entry may contain both index values "1,00" and "4,00". Entry 208 further stores a pointer to page 202, represented by pointer 210. This pointer may be an address, an offset, or any other type of indicia that uniquely identifies page 202. In a preferred embodiment, the pointer will provide information allowing for efficient retrieval of page 202. After page 206 has been created, processing continues by creating leaf nodes on pages 212, 214, and 216, each of which is pointed to by an entry on page 206.

According to one embodiment, the leaf nodes of the tree of FIG. 2 may each store a pointer to a leaf node that is ordered next in the sort order based on the index values. For example, page 202 stores a pointer 217 to page 212, and so on. This allows a search to continue from one leaf node to the next without requiring traversal of the tree hierarchy. This makes the search more efficient.

After the fourth (last) entry is created on page 206, another non-leaf node is created on newly allocated page 220. This new node includes an entry 221 that points to page 206, and that stores an index value from the first entry of page 206. In another embodiment, the first entry on page 220 could store the index value from the last entry of page 206. Creation of leaf nodes may then continue with the creation of additional leaf nodes on pages 222, 224, and 226. Corresponding entries are created on page 220.

The foregoing process continues when page 220 is full. That is, page 230 is allocated to store another non-leaf node that points to page 220, and that further points to leaf nodes such as node 232.

As can be appreciated from FIG. 2, the prior art method results in a tree that becomes increasingly unbalanced as more records are stored within the tree. This is evident from the fact that three levels of hierarchy separate pages 202 and 230, but only a single level of hierarchy separates page 230 from page 232. As a result, when the tree is being search for a particular record, search times will vary widely depending on when the record happened to be added to the tree during the creation process.

To address the foregoing problem, the tree of FIG. 2 can be "balanced" after it is created so that each leaf node is approximately the same distance from the root as all other nodes. For example, in the tree of FIG. 2, balancing could occur by re-directing pointer 240 of page 230 to point to page 206 rather than page 220. Page 220 is then inserted between pages 206 and 232. This is accomplished by deleting entry 221 of page 220, re-directing pointer 234 of page 230 to point to page 220 instead of page 232. Finally, an entry is created in page 220 pointing to page 232.

While the above-described re-balancing process appears quite simple, this process becomes increasingly complex as additional hierarchical levels are added to the tree. As a result, re-balancing of a tree can be quite time consuming. In addition, in some instance, the balancing process involves splitting pages and shifting the contents of leaf index pages and non-leaf index pages. This process is even more time-consuming.

It is important to minimize the time required to construct and, if necessary, re-balance, a database. This is particularly true because database tables cannot be accessed at certain times while they are being constructed or re-balanced. For example, while the tree of FIG. 2 is being built, users are not allowed to store data to, or retrieve data from, the database at the points where new pages are created and linked into the tree. If the construction and re-balancing process requires a large amount of time, an unacceptable delay may transpire before a user can gain access to critical data.

The disadvantages discussed above are addressed by the current invention, which provides a system and method for maintaining a balanced tree from a sorted stream of records. Because this mechanism maintains a balanced tree while the tree is being constructed, the latency associated with re-balancing a tree after it is created can be eliminated. This results in a method of building a tree that is more efficient than prior art methods. According to another aspect of the invention, the tree may be incrementally constructed in a manner that allows users to access records that have already been added to the tree while additional portions of the tree are still under construction.

Figure 3:
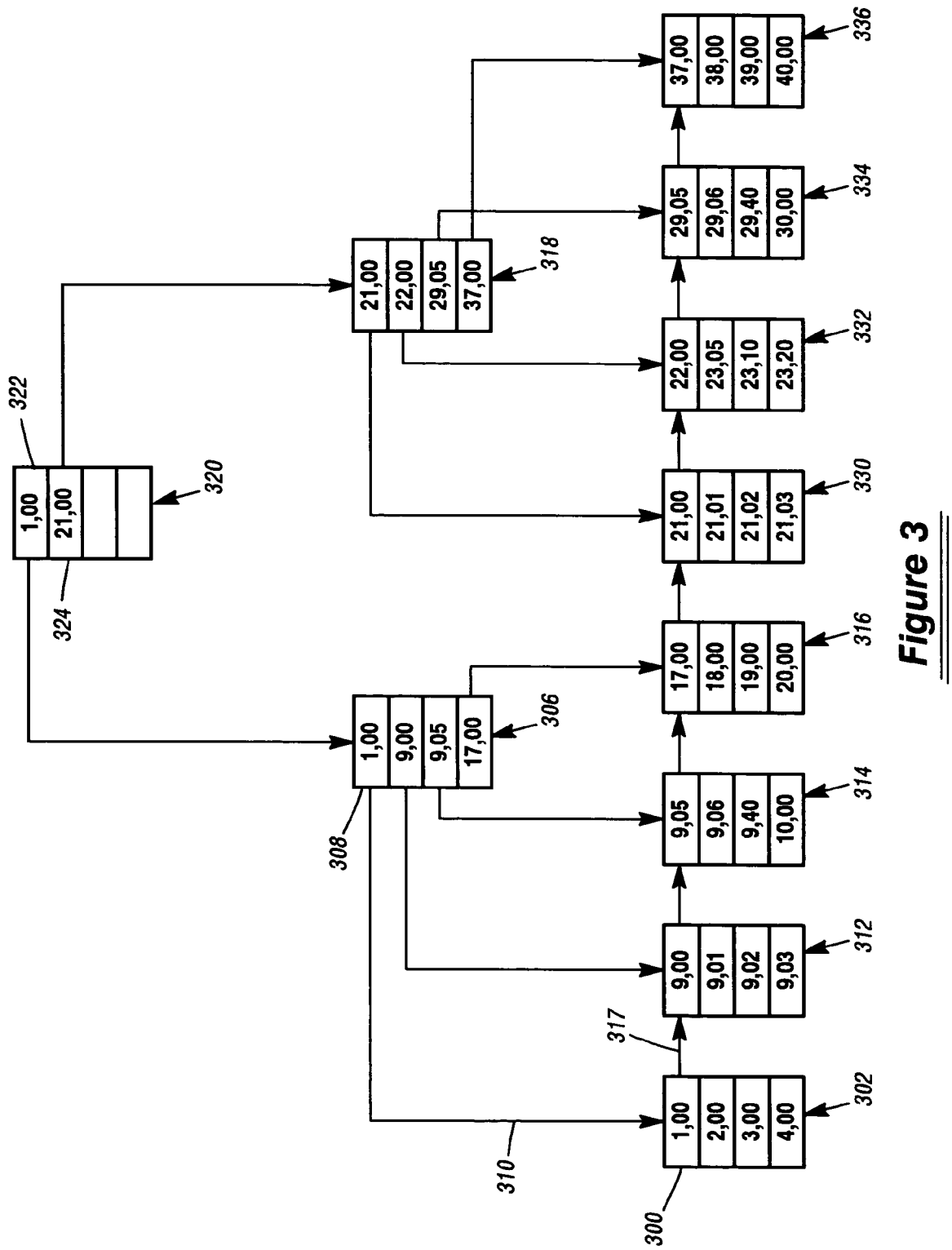
FIG. 3 is a diagram illustrating one embodiment of a process according to the current invention.

FIG. 3 is a diagram illustrating one embodiment of a process according to the current invention. According to this method, a stream of sorted records is received for use in building a database table. This table is a tree structure, as was the case in the example discussed above in reference to FIG. 2. The process is initially similar to that described above in reference to FIG. 2. That is, the first received record 300 is stored in a leaf node created on page 302. When four records have been stored on this page so that the page is considered full, the first non-leaf node is created on page 306. The first entry 308 on this page points to page 302, and stores the index value "1,00" of the first record on page 302. In another embodiment, this entry might include the index value "4,00" obtained from the last entry on page 302. In another embodiment, this entry may include both index values "1,00" and "4,00". Entry 308 further stores a pointer 310 to page 302.

After page 302 is created, additional leaf nodes are created on pages 312, 314, and 316, each of which is pointed to by an entry on page 306. According to one embodiment, at least one of the entries on each of these pages 302, 312, 314, and 316 stores a pointer to the node appearing next in the sort order based on the index values. For example, page 302 stores a pointer 317 to page 312, and so on. This allows a search to continue from one leaf node to the next without requiring the traversal of the tree hierarchy. This makes the search more efficient.

After page 306 has been filled, a sibling is created for this page at the same level of the tree hierarchy. This sibling, non-leaf node is shown as page 318. In addition to creating the sibling, a parent node is created pointing to both page 306 and the newly created sibling on page 318. This parent node, which is shown as page 320, includes an entry 322 pointing to, and including the index from, the first record of page 306. Similarly, entry 324 points to, and includes the index from, the first record of page 318.

Next, additional leaf nodes are created on pages 330, 332, 334, and 336 in the foregoing manner. Thereafter, page 318 is full, and another sibling will be created for page 318 which is pointed to by an entry of page 320. In a similar manner, when page 320 is full, both a sibling and a parent are created for page 320 and the process is repeated. This results in a tree structure that is balanced, with the same number of hierarchical levels existing between any leaf node and the root of the tree.

The above-described process stores records within leaf nodes. In an alternative embodiment, the records may be stored in storage space that is pointed to, but not included within, the leaf nodes. This may be desirable in embodiments wherein the records are large records such as Binary Large OBjects (BLOBs) that are too large for the space allocated to a leaf node.

In the above exemplary embodiment, records are sorted according to a single index field. Any available sort mechanism may be used to obtain this sort order prior to the records being added to the database tree. An alternative embodiment may be utilized wherein records are sorted according to other fields such as a primary key value, a secondary index, a clustering index, a non-clustering index, UNIQUE constraints, and etc. as is known in the art. Any field in a database entry may be used for this purpose. Additionally, multiple fields may be used to define the sort order. For example, records may be sorted first with respect to the leading column of the key, with any records having a same leading column value further sorted based on the second leading key value, and so on. Any number of fields may be used to define the sort order in this manner.

When the database tree is constructed in the manner discussed above, it may be constructed within an area of memory such as in-memory cache 107 of main memory 100 (FIG. 1). It may then be stored to mass storage devices such as mass storage devices 110*a* and 110*b*.

The mechanism described in reference to FIG. 3 results in the construction of a tree that remains balanced as each leaf node is added to the tree. Thus, no re-balancing is required after tree construction is completed, and no data need be shuffled between various leaf and/or non-leaf nodes. Moreover, if tree construction is interrupted at any point in the process, the resulting tree is balanced.

Figure 4B:
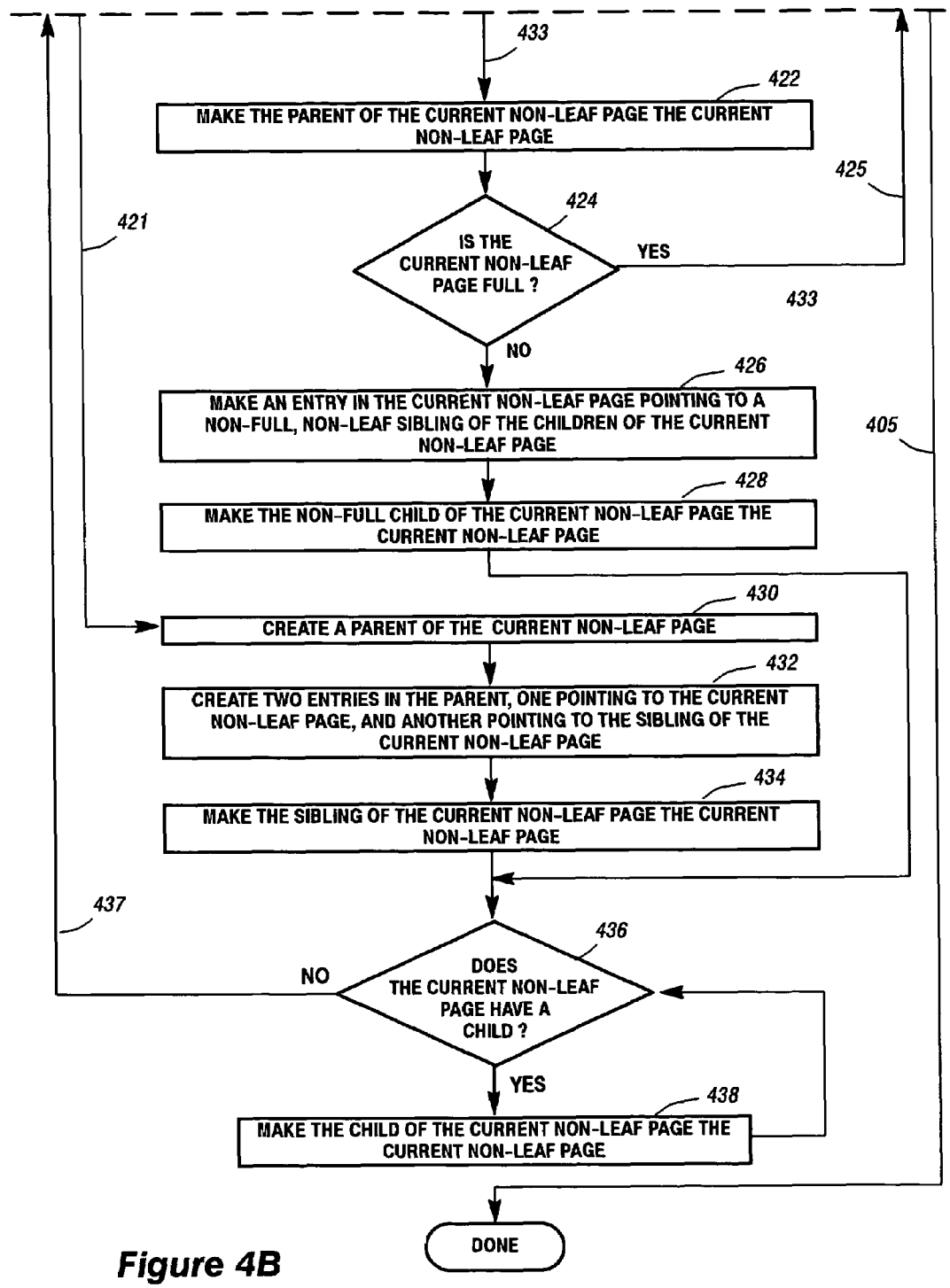

FIGS. 4A and 4B, when arranged as shown in FIG. 4, are a flow diagram-illustrating the process exemplified by FIG. 3. This process assumes that records are available in some sorted order for entry into a database table. According to this process, a non-leaf page is created. This page is made the current non-leaf page (400). Next, a leaf page is created. This page is designated the current leaf page (402). In one embodiment, a pointer or some other indicia identifying this current leaf page may be stored within a leaf page adjacent to the current page within the tree. This allows searching to be performed at the leaf node level without traversing to a higher level in the tree. In another embodiment, the links at the leaf node level may be omitted.

Next, if a record is available for entry into the database table (404), the next record is obtained (406). Otherwise, building of the database table is completed, as indicated by arrow 405.

Returning to step 406, when the next record is obtained, this record is stored within the current leaf page (408). If this does not result in the current leaf page becoming full (410), processing returns to step 404.

If storing of the most recently obtained record causes the current leaf page to become full at step 410, an entry is created in the current non-leaf page to point to the current leaf page (412). This entry may include the index value of the first record stored on the current leaf page, as shown in FIG. 3. Alternatively, the entry may store the index value of the last record, or the index values of both the first and last records, on the current leaf page.

Next, it is determined whether the current non-leaf page is full (414). If not, processing may continue with step 402 where another leaf page is created, and is made the current leaf page. Processing continues with this new leaf page in the manner discussed above. If, however, the non-leaf page is full, a sibling is created for the current non-leaf page by allocating a page of storage space (416). If this non-leaf page is at a level in the hierarchy that is not directly above the leaf pages, an entry is created in this sibling. This entry points to the non-full, non-leaf node residing at the next lower level in the hierarchy (418). Because of the mechanism used to fill the pages, only one such non-leaf node will exist. Stated another way, this entry points to the recently created sibling of the children of the current non-leaf page. This step is used to link a newly created sibling at one non-leaf level in the tree hierarchy with a newly created sibling at the next lower non-leaf level in the hierarchy. This step is invoked when the traversal of multiple levels of hierarchy occurs to locate a non-leaf page that is not full. As will be appreciated, this step will not be invoked for any current non-leaf node that is located immediately above the leaf level of the hierarchy.

Next, it is determined whether the current non-leaf page is the root of the tree (420). If not, processing continues to step 422 of FIG. 4B, as shown by arrow 433. In step 422, the hierarchy must be traversed to locate either the root of the tree, or to locate a non-leaf page that is not full. To do this, the parent of the current non-leaf page is made the current page. Then it is determined whether this new current non-leaf page is full (424). If the current non-leaf page is full, processing returns to step 416 of FIG. 4A, as indicated by arrow 425. In this step, a sibling is created for the current non-leaf page, and execution continues as discussed above. Returning to step 424, if the new current non-leaf page is not full, an entry is created in the current non-leaf page. This entry points to a non-full, non-leaf sibling of the children of the current non-leaf page. This non-full sibling is the page created during step 416, and that is at the same level in the hierarchy as the children of the current non-leaf page. This linking step makes this sibling another child of the current non-leaf page.

Next, the tree must be traversed to the lowest level of the non-leaf pages. Therefore, the newly linked non-full child of the current non-leaf page is made the new current non-leaf page (428). If the current non-leaf page has a child (436), then traversal must continue to locate a non-full, non-leaf page that does not have a child. Therefore, the child of the current non-leaf page is made the current non-leaf page (438), and processing continues with step 436.

Eventually, a non-full, non-leaf page will be encountered that does not yet store any entries. This page exists at the lowest level of the non-leaf page hierarchy, and will be used to point to leaf pages. When this page has been made the current non-leaf page, processing may continue with step 402 of FIG. 4A and the creation of the next leaf page as indicated by arrow 437.

Returning now to step 420 of FIG. 4A, if the current non-leaf page is the root of the tree, processing continues with step 430 of FIG. 4B, as indicated by arrow 421. In step 430, a parent is created for this non-leaf page. Two entries are created in the parent, with one pointing to the current non-leaf page, and the other pointing to the sibling of the current non-leaf page, which was created in step 416 (432). The tree must now be traversed to locate a non-leaf page that does not include any entries, and hence has no children. This non-leaf page will point to any leaf node pages that will be created next. To initiate this traversal, the sibling of the current non-leaf page is made the current non-leaf page. If this current non-leaf page has a child (436), the lowest level of the hierarchy has not yet been reached, and the child of the current non-leaf page must be made the new current non-leaf page (438). Processing continues in this manner until a non-leaf page is encountered that does not have any children. Then processing may continue with step 402 of FIG. 4A and the creation of additional leaf pages, as indicated by arrow 437.

The foregoing method builds a database tree from the "bottom up" rather than from the "top down". The process results in a balanced tree that does not require re-balancing after its initial creation. As a result, users are able to gain access to the tree far more quickly than would otherwise be the case if the tree were constructed, then re-balanced. Moreover, the balanced tree ensures that all nodes are the same distance from the root so that a search for one record will require substantially the same amount of time as a search for any other record.

According to another aspect of the invention, database records may be added to an existing tree structure in a manner that allows a new sub-tree to be created, then grafted into the existing tree. After a tree is created using a portion of the records included within a sorted stream of records, users are allowed to access the tree. In the meantime, a sub-tree structure is created using a continuation of the original record stream. After the sub-tree is created, the pages to which the graft occurs within the tree are temporarily locked such that users are not allowed to reference these pages. Then the sub-tree is grafted to the tree, and the pages within the tree are unlocked. Users are allowed to access the records within the tree and sub-tree. This process, which may be repeated any number of times, allows users to gain access to records more quickly than if all records must be added to a tree before any of the records can be accessed by users. In another embodiment, access to parts of the tree may be controlled using locks on individual records rather than locks on pages.

Some or all of tree 500 may be retained in an in-memory cache 107 (FIG. 1), which is an area within the main memory 100 allocated to storing portions of the database table. The sub-tree may also be constructed, and grafted to the tree, within the in-memory cache. The nodes of the tree and sub-tree that are retained within the in-memory cache may be accessed more quickly than if these nodes had to be retrieved from mass storage devices 110a and 110b. Therefore, the grafting process may be completed more quickly if the nodes involved in the grafting are stored in the in-memory cache.

Figure 5:
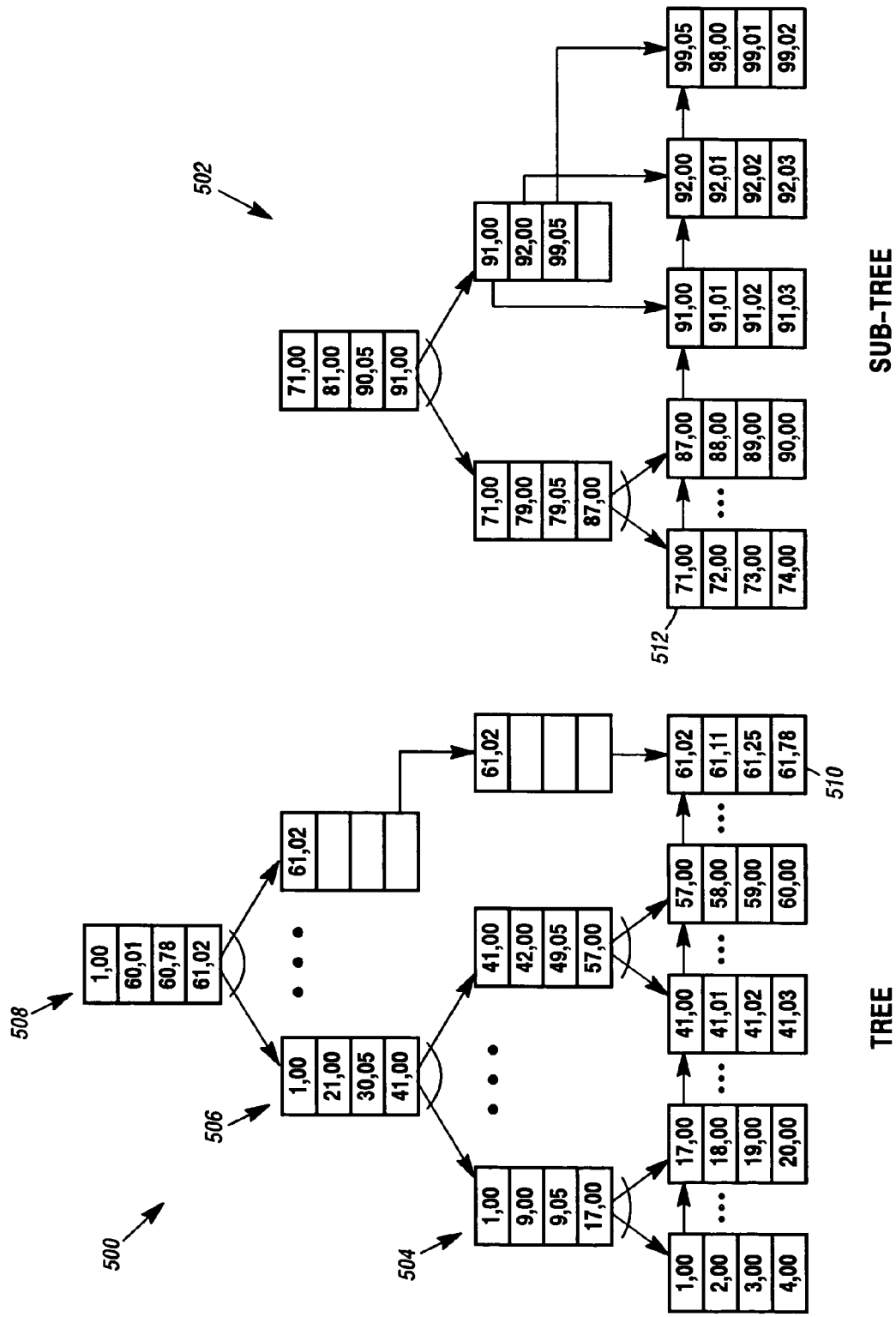
FIG. 5 is a diagram illustrating a tree and a sub-tree.

FIG. 5 is a diagram illustrating a tree 500 and a sub-tree 502. It may be noted that for ease of reference, not all existing pages of the tree or sub-tree are actually depicted in FIG. 5. For example, it will be understood that in this embodiment, page 504 of tree 500 points to four children, as do each of pages 506 and 508, and so on.

The process of creating tree 500 occurs in a manner similar to that discussed above. A stream of records is received. These records are sorted such that a known relationship exists between the index values of consecutively received records. The records may be stored within tree 500 using the method of FIG. 4 such that a balanced tree is constructed without the need to perform any re-balancing after tree creation has been completed. Users may then be granted access to the data stored within the tree.

Sometime after tree 500 is constructed, more records are received. These additional records are in the same sort order as the records used to construct tree 500. For example, assume each record added to tree 500 has an index value greater than, or equal to, the previously received record. In this case, the stream of records used to build sub-tree 502 will be in a sort order wherein each record has an index value that is greater than, or equal to, the previous record. Moreover, the first record 512 added to tree 502 will have an index value greater than, or equal to, that of the last record 510 added to tree 500, and so on. Thus, the stream of records used to build sub-tree 502 may be viewed as a continuation of the stream used to construct tree 500. Of course, other sort orders may be used instead of that discussed in the foregoing example.

When the additional records are received, these records are added to sub-tree 502. Users may not access these additional records while sub-tree 502 is being constructed. As with the construction of tree 500, sub-tree may be created using the method of FIG. 4 so that the resulting structure is balanced.

After the creation of sub-tree 502 has been completed, it is grafted onto existing tree 500. This involves connecting the root of sub-tree 502 to an appropriate non-leaf page of tree 500. It may further involve adding a pointer from a right-most leaf page of the tree to a left-most leaf page of the sub-tree. To initiate this process, tree 500 is traversed to locate the hierarchical level that is one level above the total number of hierarchical levels in sub-tree 502. In the current example, sub-tree 502 includes three levels from the root to the leaf pages. Therefore, tree 500 is traversed to locate a level that is one greater than this total sub-tree height, or four levels from the leaf pages. In the example, this results in location of the level at which root page 508 resides.

Next, within the located hierarchical level of tree 500, the page that was most recently updated to store a new entry is located. In the current example, there is only a single page 508 at the located hierarchical level, so page 508 is identified. This page becomes the potential grafting point. If this page is not full, sub-tree 502 will be grafted onto tree 500 via page 508. That is, an entry will be created in page 508 to point to the root of sub-tree 502. If this page is full, as is the case in FIG. 5, some other action must be taken to facilitate the grafting process, as is illustrated in FIG. 6.

Figure 6:
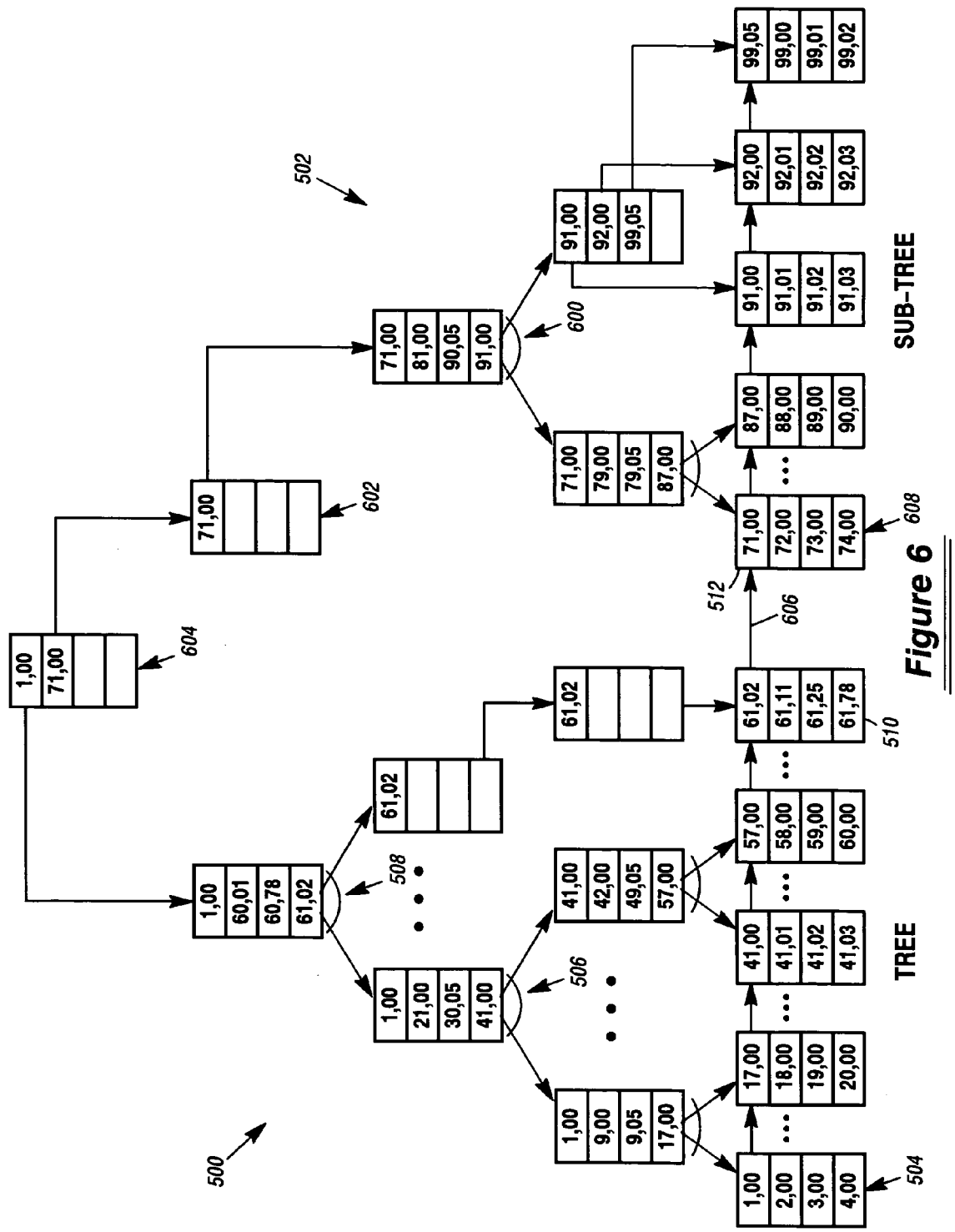
FIG. 6 is a diagram illustrating the grafting of exemplary sub-tree onto a tree.

FIG. 6 is a diagram illustrating the grafting of exemplary sub-tree 502 onto tree 500. As discussed in reference to FIG. 5, a potential grafting point is first located within tree 500. In the current example, the potential grafting point is page 508. If this page were not full, the page would be locked to prevent any other updates and an entry would be created in page 508 pointing to page 600 of sub-tree 502. Page 508 is full, however, such that some other action must be taken to accomplish the grafting process.

A process similar to that employed above may be used to graft sub-tree 502 to tree 500. That is, a sibling is created for page 508. This sibling, shown as page 602, is linked to page 600 by creating an entry pointing to page 600. Next, since page 508 is the root of tree 500, a parent is created for page 508. This parent, shown as page 604, is linked both to pages 508 and 602 by creating respective entries pointing to these pages.

During the grafting process discussed above, when a new sibling or parent node is created, that new node is locked. Users are prevented from retrieving, or updating, any data stored within a new node until the grafting process is complete. This prevents users from traversing those portions of the tree that are descendants of the new nodes.

It will be noted that the specific actions used to complete the linking process depend on the structure of the tree. For example, the tree to which the sub-tree is being grafted may include many more hierarchical levels than are shown in FIG. 6. Moreover, many of these levels may have to be traversed before a non-full node is located to complete the graft. Finally, it may be noted that the process discussed above will be somewhat different if the sub-tree includes more hierarchical levels than the original tree structure. In that case, grafting occurs in a similar manner, except that during the grafting process, the tree is grafted into the sub-tree, as will be discussed further below. Therefore, it will be appreciated that the scenario illustrated in FIG. 6 is exemplary only. One embodiment of a generalized process of creating the graft is illustrated in FIGS. 7A through 7D.

In one embodiment, an additional link may be created at the leaf node level to graft sub-tree 502 to the tree 500. To do this, tree 500 is traversed to locate the leaf page that received the last record in the stream during tree creation. This leaf page of the tree is then linked to the page of the sub-tree that received the first record during sub-tree creation. In the current illustration, this involves linking leaf page 510 at the right edge of tree 500 to leaf page 608 at the left edge of sub-tree 502, as shown by pointer 606. This pointer may be formed by storing an address, an offset, or any other indicia within page 510 that uniquely identifies page 608.

FIGS. 7A through 7D, when arranged as shown in FIG. 7, are a flow diagram illustrating one embodiment of the process of grafting a sub-tree onto a tree in a manner that maintains a balanced tree structure. First, a tree structure is created for use in implementing a database table (700). In one embodiment, this tree structure is created from a sorted stream of records according to the process illustrated in FIG. 4. After creation of the original tree, users may be allowed to access the records stored within the tree. Next, a sub-tree may be created from a continuation of the original sorted stream of records. The sub-tree is therefore sorted with respect to the initially received stream of records (702). This is as shown in FIG. 6. In one embodiment, this sub-tree is created using the process of FIG. 4, although this need not be the case, as will be discussed further below.

Next, it is determined how many hierarchical levels are included within the sub-tree and within the sub-tree (704). If more levels of hierarchy exist in the tree (705), processing continues with step 706, where the tree is traversed to locate the level in the hierarchy that is one level about the height of the sub-tree. Next, within the located level of hierarchy of the tree, the last updated page is located (708). This will be referred to as the "current page". In the current embodiment, this will be the right-most page residing within the located level. If space is available within the current page (710), processing continues to step 712 of FIG. 7B, as indicated by arrow 711. At step 712, the current page is locked to prevent user access. That is, users are prevented from either reading from, or writing to, this page. Then an entry is created within this page that points to the root of the sub-tree (712). This effectively grafts the sub-tree into the tree structure, making the current page the parent of the root of the sub-tree.

Figure 7A:
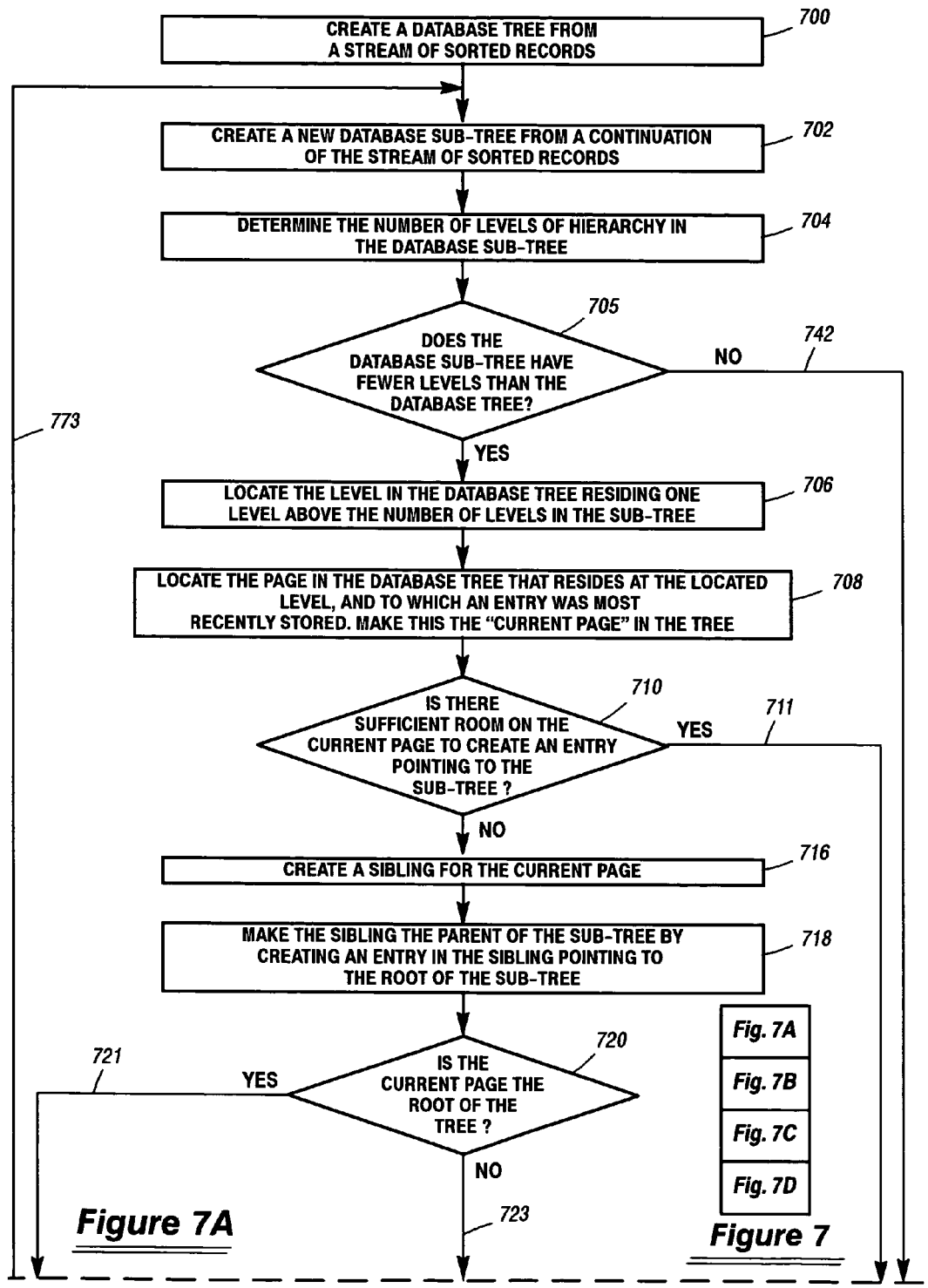
FIGS. 7A through 7D, when arranged as shown in FIG. 7, are a flow diagram illustrating one embodiment of the process of grafting a sub-tree onto a tree in a manner that maintains a balanced tree structure.
Figure 7B:
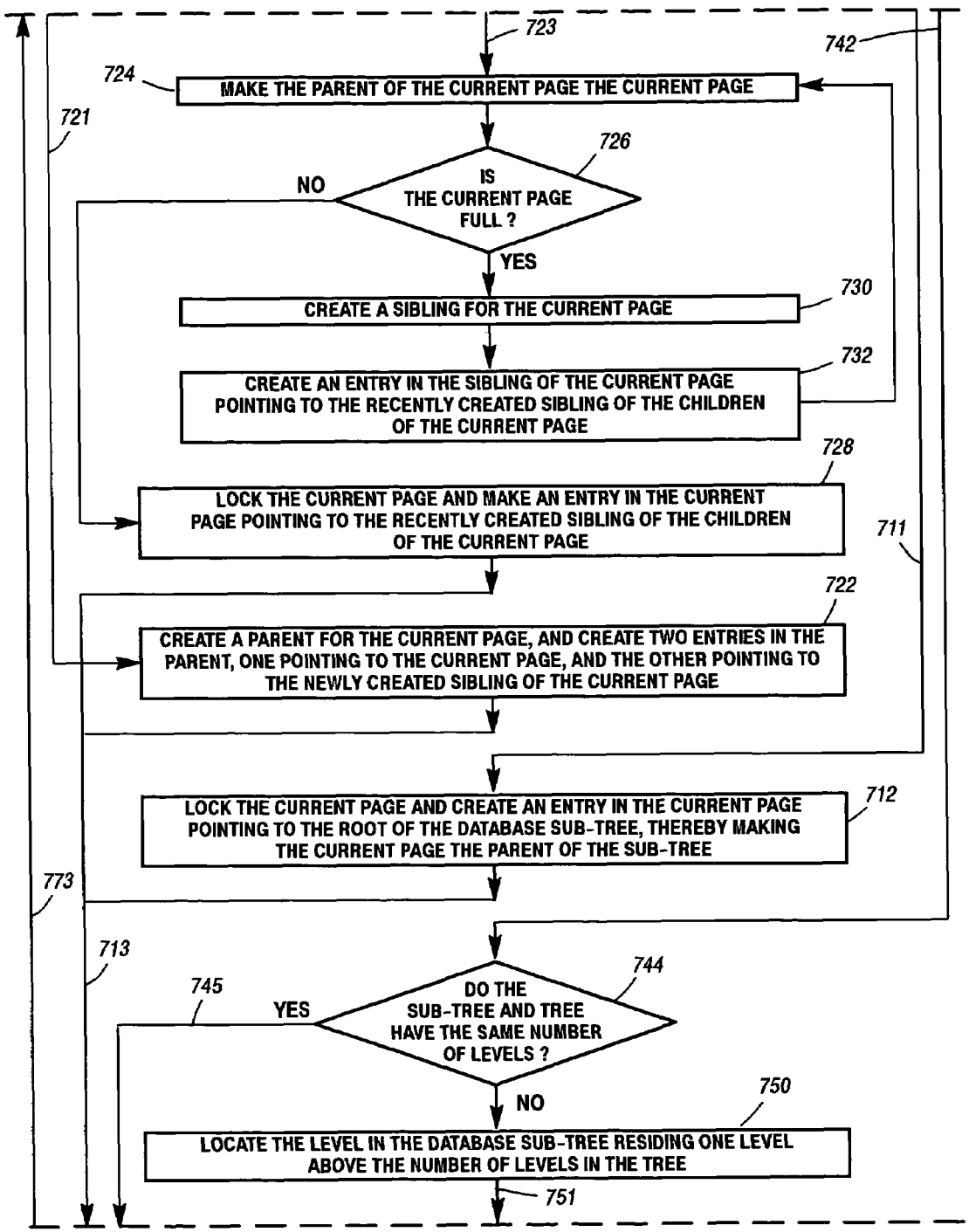
Figure 7C:
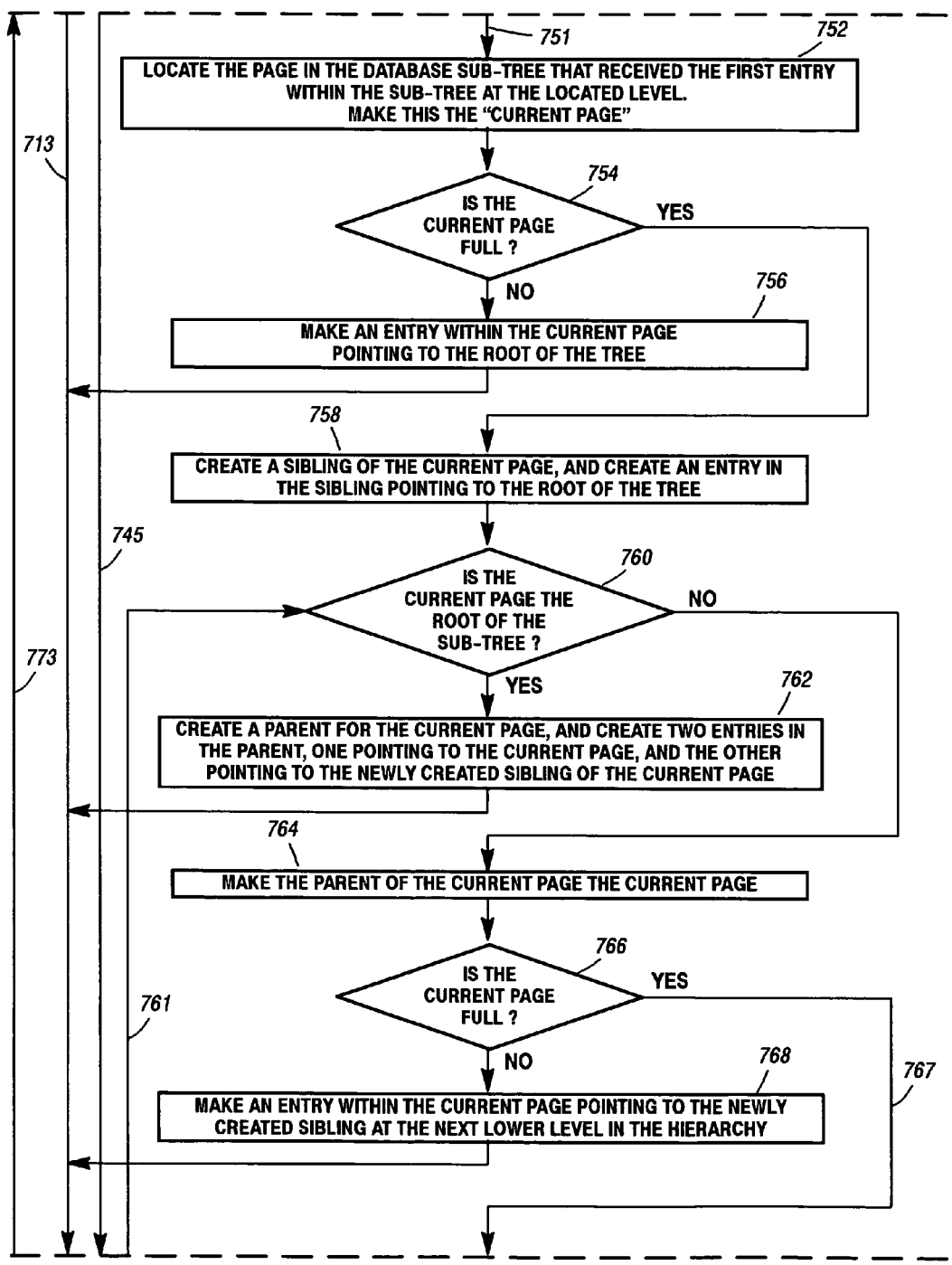
Figure 7D:
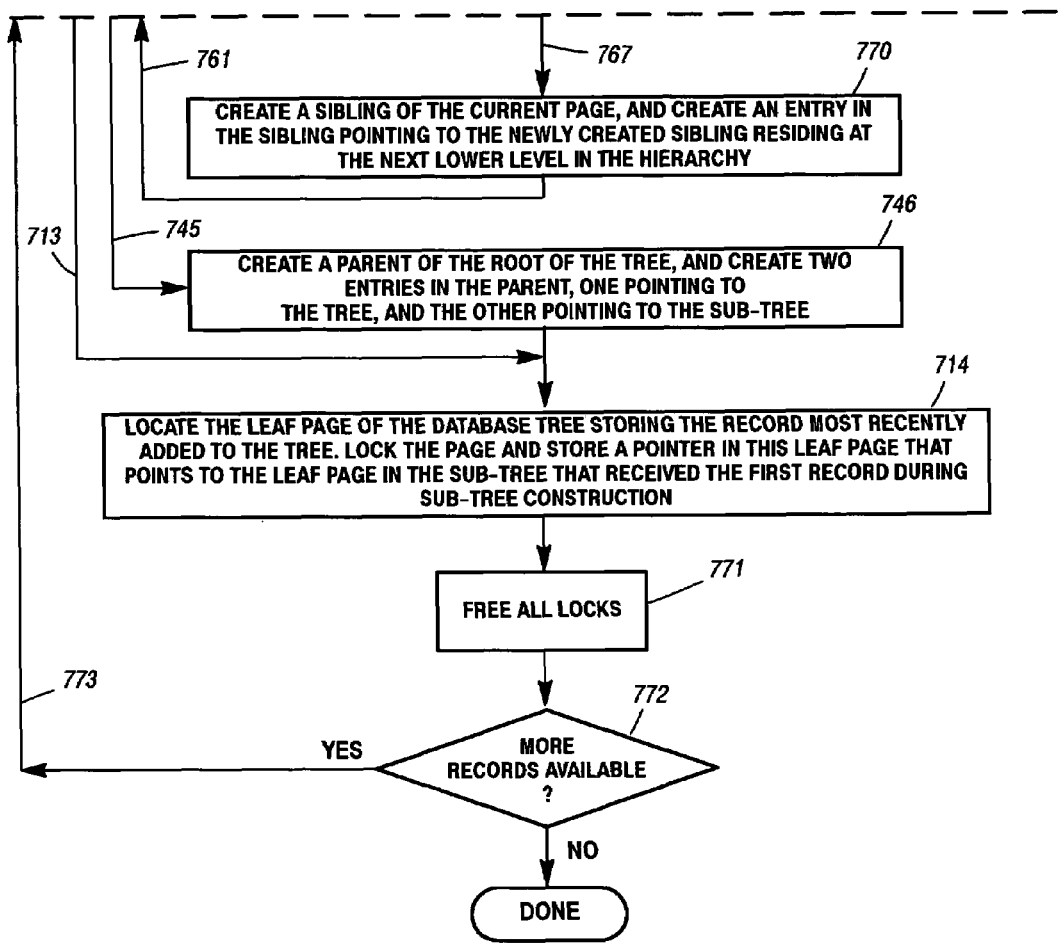

Next, processing continues with step 714 of FIG. 7D, as indicated by arrow 713. At step 714, a link may be created to graft the tree to the sub-tree at the leaf page level. This may be accomplished by locating the leaf page at the right-hand edge of the tree. This is the page that stores the record most recently added to the tree. The located leaf page is locked to prevent user access, and an indicator is stored within this page that points to, or otherwise identifies, the leaf page at the left-hand edge of the sub-tree, which is the leaf page in the sub-tree that was first to receive a record when the sub-tree was created (714). The indicator stored within the leaf page of the tree may comprise an address, and address offset, or any other indicia that may be used to uniquely identify the leaf page of the sub-tree. This links the leaf node at the right edge of the tree with the leaf node at the left edge of the sub-tree. In embodiments that do not include links at the leaf page level, this step may be omitted. This concludes the grafting process.

After the grafting process has been completed, all locks that have been invoked on pages within the tree are released (771). This allows users to access all records within the current tree structure, including all records that had been included within the sub-tree, and which are now grafted into the tree. Finally, if any more records are available to be added to the tree, processing may return to step 702 of FIG. 7A where another sub-tree is created for grafting to the tree, a shown by step 772 and arrow 773.

In one embodiment, each sub-tree may be created to include a predetermined number of records. In another embodiment, each sub-tree may be created to include a number of records that may be processed during a predetermined time interval. Any other mechanism may be used to determine which records are added to a given sub-tree.

Returning to step 710 of FIG. 7A, if sufficient space is not available on the current page to create another entry, the sub-tree must be grafted to the tree using a process similar to that shown in FIG. 4. That is, a sibling is created for the current page (716). An entry is created within this sibling that points to the sub-tree, thereby grafting the sibling to the sub-tree (718). If the current page is the root of the tree (720), processing continues to step 722 of FIG. 7B, as indicated by arrow 721. In step 722, a parent is created for the current page. A first entry is created in the parent pointing to the current page, and another entry is created within the parent pointing to the newly created sibling of the current page. Next, processing may optionally continue with step 714 of FIG. 7D, as indicated by arrow 713. In step 713, the tree is linked to the sub-tree at the leaf level, as discussed above.

Returning to step 720 of FIG. 7A, if the current page of the tree is not the root, processing continues to FIG. 7B, as indicated by arrow 723. The tree must be traversed to find a page at a higher level in the hierarchy that is capable of receiving another entry that will graft the sub-tree to the tree. Therefore, in step 724 of FIG. 7B, the parent of the current page is made the new current page. If this current page is not full (726), the sub-tree may be grafted to the tree at this location. To accomplish this, the current page is locked to prevent user access to the page during the grafting process.

An entry is then created in the current page that points to the newly created sibling that exists at the next lower level of the hierarchy (728). This grafts the sub-tree to the tree. Processing may optionally continue with step 714 of FIG. 7D to link the sub-tree to the tree at the leaf level, and the method is completed.

Revisiting step 726, if the new current page is full, a sibling must be created for the current page (730). An entry is created in this sibling that points to the newly-created sibling that resides at the next lower level in the hierarchy (732). Then the process must be repeated with step 724. That is, tree traversal continues until either a non-full page is located to which the sub-tree may be grafted, or until the root of the tree is encountered, in which case both the tree and sub-tree are grafted to a newly created tree root.

Next, returning to step 705 of FIG. 7A, it may be possible for the sub-tree to have the same number, or more, levels of hierarchy, than the tree. In either of these cases, processing continues with step 744 of FIG. 7B, as illustrated by arrow 742. If the sub-tree and tree have the same number of levels of hierarchy (744), processing continues to step 746 of FIG. 7D, as indicated by arrow 745. In step 746, a parent is created for the root of the tree (746). An entry is created in the parent pointing to the tree, and another entry is created pointing to the sub-tree. Optionally, the tree and sub-tree may then be linked at the leaf page level in step 714, as discussed above.

Returning to step 744 of FIG. 7B, if the sub-tree has more levels than the tree, processing continues on FIG. 7B. In this case, the tree will be grafted into the "left-hand" side of the sub-tree. This will require a slightly different approach than if the tree has more levels than the sub-tree. This is because in the current embodiment, it is known that all pages at the "left-hand" edge of the sub-tree (other than the root node) will be full. Additionally, the root node may be full.

To perform the grafting process, the sub-tree is traversed to the hierarchical level that is one level above the root of the tree (750). Processing then continues to FIG. 7C, as indicated by arrow 751. The page residing at the left-hand edge of this sub-tree level is located and made the current page (752). This will be the page within the located hierarchical level that was first to receive an entry when the sub-tree was constructed. Next, it is determined whether this page is full (754). If it is not full, this page is the root node. An entry may be created within the page pointing to the root node of the tree (756), thereby grafting the tree into the sub-tree. Processing then continues with step 714, as indicated by arrow 713.

Returning to step 754, if the current page is full, a sibling must be created for the current page. An entry is created within the sibling pointing to the root of the tree (758), thereby linking the tree to the newly created sibling. Next, if the current page is the root of the sub-tree (760), a parent is created for the current page (762). Two entries are created within this parent, one pointing to the current page, and the other pointing to the newly created sibling of the current page. Processing then concludes by continuing to step 714 of FIG. 7D.

If the current page is not the root of the sub-tree (760), the sub-tree must be traversed until the root is located. To accomplish this, the parent of the current page is made the new current page (764). If this new current page is not full (766), it is known that this new current page is the root of the sub-tree. An entry is created in the current page that points to the newly created sibling at the next lower level in the hierarchy (768). This links the tree to the sub-tree, and processing may continue with step 714 of FIG. 7D.

Otherwise, if the current page is full in step 766, processing continues to FIG. 7D, as indicated by arrow 767. There, a sibling is created for the current page (770). An entry is created in this sibling that points to the newly created sibling at the next lower level in the hierarchy. Processing then continues with step 760 of FIG. 7C, as indicated by arrow 761. The process is repeated until a non-full root of the sub-tree is encountered, or until a full root is located and a new root is created that points to both the sub-tree and the tree. After the sub-tree has been grafted into the tree in this manner, all pages are unlocked, or "freed", as discussed above (771), and the process of creating additional sub-trees may be repeated for any additional records, as indicated by steps 772, and the possible return to the steps of FIG. 7A, as illustrated by arrow 773. If no additional records are available to process, execution is completed.

The process of building trees incrementally using the foregoing grafting process allows users to access data within the records of the database much more quickly than would otherwise be the case if all records were added to a database tree prior to allowing users to access the data. This is because users are allowed to access records within the tree while a sub-tree is being constructed. After the sub-tree is completed, users are only temporarily denied access to some of the records within the tree while the grafting process is underway, and are thereafter allowed to access records of both the tree and sub-tree. The grafting process may be repeated any number of times. If desired, all sub-trees may be constructed in increments that include the same predetermined number of records, and hence the same number of hierarchical levels. This simplifies the process of FIGS. 7A through 7D, since grafting will always occur the same way, with the sub-tree always being grafted into a predetermined level of the tree hierarchical structure, or vice versa. In another embodiment, sub-trees may be built according to predetermined time increments. That is, a sub-tree will contain as many records as are added to the sub-tree within a predetermined period of time. After the time period expires, the sub-tree is grafted to an existing tree or vice versa, and the process is repeated.

The grafting process discussed above in reference to FIGS. 7A through 7D generates a tree by adding sub-trees from the left to the right. In another embodiment, sub-trees may be grafted to the left-hand edge of the tree. It may further be noted that the exemplary embodiment provides records that are sorted such that each record has an index, key, or other value that is greater than, or equal to, that of the preceding record. This need not be the case, however. If desired, records may be sorted such that the values stored within the search fields are in decreasing order.

It may be further noted that the grafting process described above illustrate an embodiment wherein the resulting tree structure is balanced. However, the grafting process discussed herein may be used to generate unbalanced, as well as balanced, tree structures. For example, assume that an unbalanced tree structure similar to that shown in FIG. 2 has been created using the prior art tree generation process discussed above. After this tree is created, users may be allowed to access the data records stored within, or otherwise associated with, the leaf pages of this tree. In the mean time, a sub-tree may be created using the same, or a different tree generation process. This sub-tree need not be balanced during the construction process. Assuming the sub-tree does not have as many hierarchical levels as the tree, it may then be grafted into the tree of FIG. 2 by creating an entry such as may be stored within page 230 of the tree. This entry points to the root of the sub-tree. If no space were available within page 230, and the application does not require that the resulting tree remain balanced, a root node could be created that points to both the tree and the sub-tree. An unbalanced tree structure of this nature may be advantageous if recently added records are being accessed more often than prior added records. A similar mechanism may be used to graft a tree to a sub-tree that has more hierarchical levels than the tree. If required, the resulting tree structure could be re-balanced after the grafting process is completed.

Figure 8:
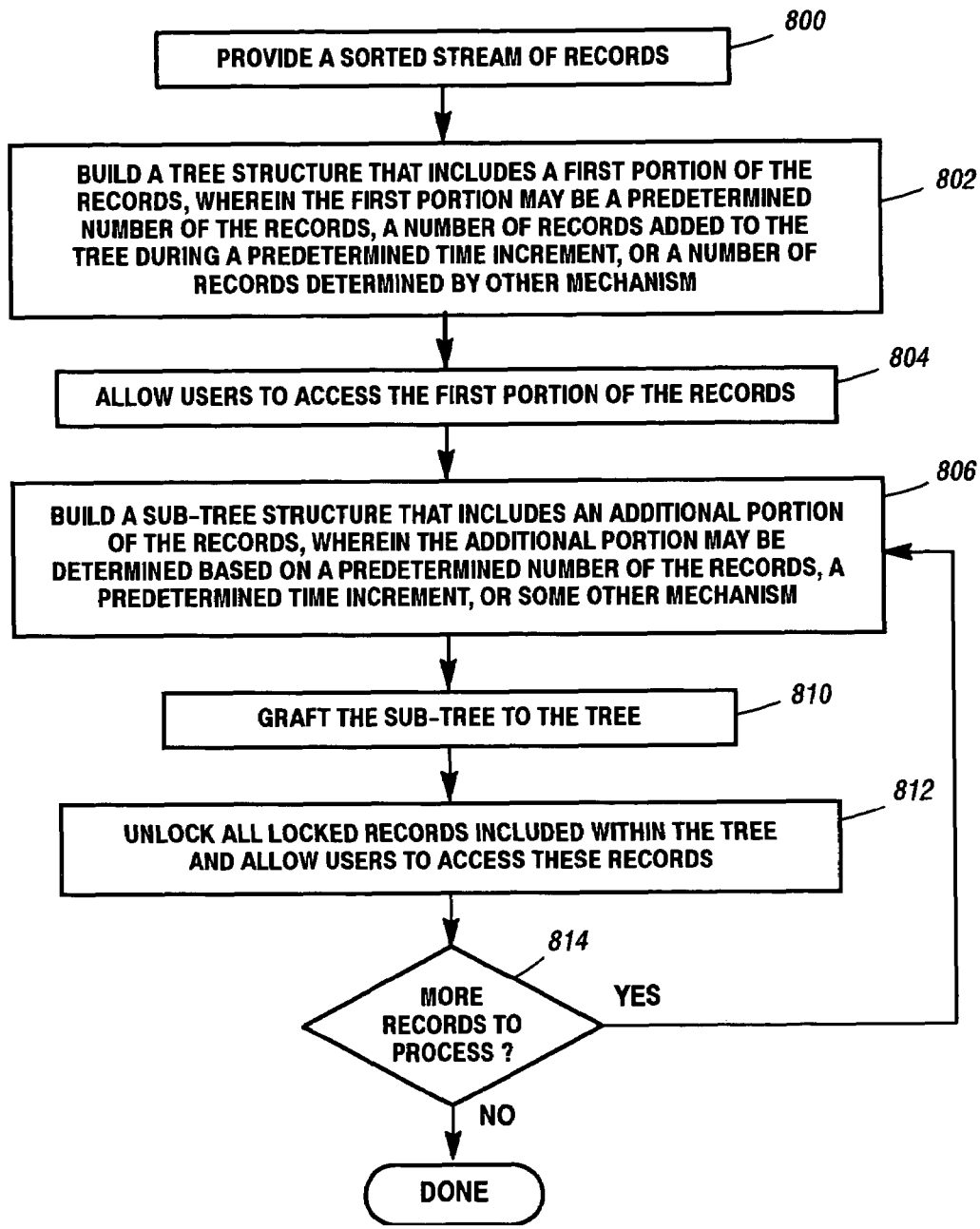
FIG. 8 is a flow diagram illustrating a generalized embodiment of the grafting process that creates a balanced tree structure.

FIG. 8 is a flow diagram illustrating a generalized embodiment of the grafting process that does not require the resulting tree structure to be balanced. The process requires that a sorted stream of records is available for building the tree and sub-tree (800). A tree is created that includes a first portion of the records in the sorted stream of records (802). This first portion may, but need not, include a predetermined number of records, or may include a number of records within the stream that is processed within a predetermined period of time. As another alternative, building of the sub-tree may continue until a particular record in the stream is encountered. Any other mechanism may be utilized to indicate completion of the tree or sub-tree construction process.

After the tree is constructed to contain the first portion of records, users are allowed to access the records in the tree (804). Meanwhile, a sub-tree is constructed that includes an additional portion of the records in the sorted stream (806). If desired, this additional portion may contain a predetermined number of records, or a number of records within the stream that is processed within a predetermined time increment. As another example, building of the sub-tree may continue until a particular record within the stream is encountered. Any other mechanism may be used to determine the number of records to add to the sub-tree.

When construction of the sub-tree has been completed, it may be grafted to the tree (810). This grafting process may be accomplished using a mechanism such as described in FIGS. 7A through 7D. Alternatively, a simplified approach may be used that creates a new root that will point to both the tree and the sub-tree. If this latter approach is employed, the resulting tree structure may not be balanced, however.

After grafting is completed, any pages or records that were locked during the grafting process are unlocked so that users may gain access to all records in the updated tree structure (812). If more records remain to be processed (814), execution continues with step (806). Otherwise, processing is completed. If all records in the sorted stream are processed, and additional sorted records thereafter become available for processing, steps 806 through 814 may be repeated to add the additional records to the tree. This assumes the additional records are sorted in a sort order that may be considered a continuation of the original stream of records.

The examples discussed above involve B+-trees that store records, or pointers to the records, on the leaf nodes. B-trees are variants of this structure, and store records on both leaf and non-leaf nodes. It will be appreciated by those skilled in the art that the inventive concepts described herein may be applied to the construction of B-trees as well as other types of hierarchical tree structures. Moreover, other variations of the foregoing examples may be contemplated by those skilled in the art. Thus, the foregoing is to be considered illustrative in nature, and not limiting, with the scope of the invention to be defined by the appended Claims and their equivalents.

What is claimed is:

1. A processor-based method of constructing a data structure having a root node, leaf nodes and non-leaf nodes defining multiple hierarchical levels, comprising: a.) creating and storing data into one or more leaf nodes; b.) creating a non-leaf node of the data structure as a parent of each of the one or more leaf nodes;

c.) creating another non-leaf node and adding the created non-leaf node to the data structure so that the created non-leaf node and all other non-leaf nodes within the data structure that are parents of leaf nodes are located a same number of hierarchical levels from the root node of the data structure;

d.) repeating steps a.)-c.) one or more times;

e.) allowing a user to search the data structure;

f.) while the user is searching the data structure, creating a second data structure that includes a root node, leaf nodes, and non-leaf nodes defining multiple hierarchical levels, with all of the leaf nodes of the second data structure residing a same number of hierarchical levels from the root node of the second data structure;

g.) preventing access to one or more nodes of the data structure;

h.) adding the second data structure to the data structure such that all leaf nodes in the data structure, including leaf nodes that had been included within the second data structure, reside a same number of hierarchical levels from the root node of the data structure; and i.) allowing the user to access all nodes of the data structure.

2. A computer-implemented method of building a tree having leaf nodes, non-leaf nodes, and a root, the method comprising:

a.) creating a leaf node;

b.) storing data within the leaf node;

c.) selecting a non-leaf node that may be made the parent of the leaf node if the non-leaf node contains sufficient storage space, the non-leaf node being selected such that data within the leaf nodes of the tree will be maintained in a predetermined sort order;

d.) if the non-leaf node includes sufficient storage space, making the non-leaf node the parent of the leaf node;

e.) if the non-leaf node does not include sufficient storage space, creating one or more additional non-leaf nodes to add to the tree, one of the one or more additional non-leaf nodes being made the parent of the leaf node such that the leaf node is located a same distance from the root of the tree as any other leaf node included within the tree and the predetermined sort order is maintained;

f.) allowing one or more users to gain access to the tree;

g.) while users are accessing the tree, building a sub-tree having leaf nodes, non-leaf nodes, and a root, and wherein all leaf nodes of the sub-tree reside a same distance from the root of the sub-tree and store data in the predetermined sort order; and h.) modifying the tree to include the sub-tree, the tree being modified such that all leaf nodes of the tree, including the leaf nodes that were included in the sub-tree, reside a same distance from the root of the modified tree.

3. The method of claim 2, and further including repeating steps a.)-e.) one or more times.

4. The method of claim 2, and further including repeating steps f.)-h.) one or more times.

5. A computer-implemented method of creating a data structure from a sorted list of records, the data structure including leaf nodes and non-leaf nodes, the method comprising:
- a.) storing one or more of the sorted list of records within storage space associated with a leaf node of the data structure;
- b.) linking the leaf node to a predetermined non-leaf node of the data structure if the predetermined non-leaf node has storage space available, otherwise, creating a current sibling for the predetermined non-leaf node and linking the leaf node to the current sibling; and
- c.) if a current sibling exists, doing one of the following: making a parent of the predetermined non-leaf node the parent of the current sibling if
- storage space is available within the parent of the predetermined non-leaf node, otherwise creating a sibling for the parent of the predetermined non-leaf node and making the sibling of the parent the parent of the current sibling,
- wherein each of the sorted list of records includes at least one sort value, and wherein the linking step further including storing within the non-leaf node at least one predetermined sort value from a predetermined one of the records stored within the storage space associated with the leaf node.

6. The method of claim 5, wherein the storage space is included within the leaf node.

7. The method of claim 5, wherein the storage space is identified by an indicator stored within the leaf node.

8. A computer-implemented method of creating a data structure from a sorted list of records, the data structure including leaf nodes and non-leaf nodes, the method comprising:
- a.) storing one or more of the sorted list of records within storage space associated with a leaf node of the data structure;
- b.) linking the leaf node to a predetermined non-leaf node of the data structure if the predetermined non-leaf node has storage space available, otherwise, creating a current sibling for the predetermined non-leaf node and linking the leaf node to the current sibling; and
- c.) if a current sibling exists, doing one of the following: making a parent of the predetermined non-leaf node the parent of the current sibling if
- storage space is available within the parent of the predetermined non-leaf node, otherwise creating a sibling for the parent of the predetermined non-leaf node and making the sibling of the parent the parent of the current sibling,
- d.) making any created sibling of the parent the current sibling;
- e.) making any existing parent of the predetermined non-leaf node the predetermined non-leaf node;
- f.) repeating steps c.)-e.) until the current sibling is included within the data structure;
- g.) locating a non-leaf node that has storage space available and that does not have any children that are non-leaf nodes, and making the located non-leaf node the predetermined non-leaf node; and
- h.) repeating steps a.)-g.) one or more times.

9. The method of claim 8, and including repeating steps a.)-g.) until a predetermined number of the records are processed.

10. The method of claim 8, and including repeating steps a.)-g.) for a predetermined period of time.

11. The method of claim 8, and including:
- allowing users to access the data structure;
- creating a second data structure that includes records within the sorted list that have not yet been added to the data structure;
- prohibiting access to one or more nodes of the data structure;
- modifying the data structure to include the second data structure; and
- allowing users to access all nodes of the modified data structure.

12. The method of claim 11, wherein records are added to both of the data structure and the second data structure according to a sort order determined by the sorted list.

13. The method of claim 11, and further including repeating all steps of claim 11 one or more times.

14. The method of claim 11 wherein the second data structure includes a predetermined number of records.

15. The method of claim 11, wherein the creating of the second data structure is performed for a predetermined period of time.

16. The method of claim 11, wherein creating the second data structure comprises:
- (i) storing one or more of the records within storage space associated with a leaf node of the second data structure;
- (j) linking the leaf node of the second data structure to a predetermined non-leaf node of the second data structure if the predetermined non-leaf node has storage space available, otherwise, creating a current sibling for the predetermined non-leaf node of the second data structure and linking the leaf node of the second data structure to the current sibling;
- (k) if a current sibling was created in step (j), doing one of the following:
  - if storage space is available within a parent of the predetermined non-leaf node of the second data structure, making the parent of the predetermined non-leaf node the parent of the current sibling, otherwise
  - creating a sibling for the parent of the predetermined non-leaf node of the second data structure and making the sibling of the parent the parent of the current sibling; and
- (i) making the parent of the predetermined non-leaf node of the second data structure the predetermined non-leaf node of the second data structure, making the sibling of the parent the current sibling, and repeating step k.) until the current sibling has been added to the second data structure.

17. The method of claim 11, wherein the modified data structure includes the leaf nodes of the data structure, the leaf nodes of the second data structure, and a root node, and wherein the same number of hierarchical levels exists between the root node and all leaf nodes in the modified data structure.

18. A computer-implemented method of building a data structure, the data structure being hierarchical and including leaf nodes and non-leaf nodes, the method comprising:
- a.) receiving a stream of records sorted according to a predetermined sort order;
- b.) obtaining at least one record from the sorted stream as determined by the predetermined sort order;
- c.) creating a leaf node;
- d.) associating the at least one record with the leaf node;

e.) if a predetermined non-leaf node has storage space available, making the leaf node a child of the predetermined non-leaf node such that the leaf node will reside at a same hierarchical level within the data structure as the level at which any other leaf node within the data structure resides; and f.) if the predetermined non-leaf node does not have storage space available, creating one or more additional non-leaf nodes, making one of the one or more additional non-leaf nodes the parent of the leaf node, and adding the one or more additional non-leaf nodes to the data structure such that the leaf node will reside at a same hierarchical level within the data structure as the level at which any other leaf node within the data structure resides;

(g.) allowing users to access the leaf nodes and the non-leaf nodes of the data structure;

(h.) creating a sub-tree having leaf nodes, wherein each of the leaf nodes is associated with one or more of the records, and wherein each of the leaf nodes resides at a same hierarchical level within the sub-tree as any other of the leaf nodes; and (i.) grafting the sub-tree to the data structure such that all of the leaf nodes and non-leaf nodes included within the data structure and the sub-tree are included in an updated data structure, and each of the leaf nodes of the updated data structure resides at a same level in the hierarchy as any other of the leaf nodes of the updated data structure; and (j.) allowing the users to access the updated data structure.

19. The method of claim 18, wherein the predetermined non-leaf node is the non-leaf node within the data structure that most recently was made a parent of a leaf node within the data structure.

20. The method of claim 18, and including repeating steps b.)-f.) one or more times.

21. The method of claim 18, and further including:
making the updated data structure the data structure; and
repeating steps g.)-j.) one or more times.

22. The method of claim 18, wherein each sub-tree includes a predetermined portion of the data.

23. The method of claim 18, wherein each sub-tree includes a portion of the data that may be added to the sub-tree in a predetermined period of time.

24. The method of claim 18, and further including storing information in one or more leaf nodes that identifies at least one other leaf node.

* * * * *